United States Patent
Bogner (10) Patent No.: US 10,152,346 B2
(45) Date of Patent: *Dec. 11, 2018

(54) SYSTEM AND METHOD FOR HYPERVISOR-BASED REMEDIATION AND PROVISIONING OF A COMPUTER

(71) Applicant: INTEL CORPORATION, Santa Clara, CA (US)

(72) Inventor: Etay Bogner, Zippori (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/411,894

(22) Filed: Jan. 20, 2017

(65) Prior Publication Data

US 2017/0199754 A1  Jul. 13, 2017

Related U.S. Application Data

(63) Continuation of application No. 13/042,846, filed on Mar. 8, 2011, now Pat. No. 9,584,322.

(60) Provisional application No. 61/312,674, filed on Mar. 11, 2010, provisional application No. 61/311,400, filed on Mar. 8, 2010.

(51) Int. Cl.
| | |
|---|---|
| G06F 9/00 | (2006.01) |
| G06F 9/455 | (2018.01) |
| H04L 9/32 | (2006.01) |
| G06F 7/04 | (2006.01) |

(52) U.S. Cl.
CPC ............ *G06F 9/45558* (2013.01); *H04L 9/32* (2013.01); *H04L 9/3263* (2013.01); *G06F 2009/45587* (2013.01)

(58) Field of Classification Search
CPC ...... G06F 3/0632; G06F 3/067; G06F 3/0607; H04L 9/32
See application file for complete search history.

(56) References Cited

U.S. PATENT DOCUMENTS

| | | | | |
|---|---|---|---|---|
| 6,226,743 B1 * | 5/2001 | Naor | ............ | H04L 9/3236 707/E17.012 |
| 7,441,043 B1 * | 10/2008 | Henry | ............ | H04L 29/1233 709/238 |
| 9,053,471 B2 * | 6/2015 | Mages | ............ | G06Q 20/02 |

(Continued)

*Primary Examiner* — Lynn D Feild
*Assistant Examiner* — Abdullah Almamun
(74) *Attorney, Agent, or Firm* — Womble Bond Dickinson (US) LLP (57) ABSTRACT

A computer located outside of an organizational computing environment is remotely prepared and configured to work in the organizational computing environment. A hypervisor operating system is installed and replaces the primary operating system of the computer, and the primary operating system, virtual software appliances (VSA) and virtual machines (VM) can execute as processes of the hypervisor. The hypervisor is configured to establish secure connection with organizational computing environment and to receive from it organization-configured image software for configuring the compute to work in the organizational computing environment. The secure connection can also be used for remote maintenance of the computer even when the computer operating system is faulty or inactive.

16 Claims, 4 Drawing Sheets

(56) References Cited

U.S. PATENT DOCUMENTS

| | | | |
|---|---|---|---|
| 2007/0083763 A1* | 4/2007 | Itoh | H04L 9/3247 713/176 |
| 2007/0101025 A1* | 5/2007 | Brown | H04L 63/0823 709/248 |
| 2009/0063849 A1* | 3/2009 | Doyle | H04L 29/12839 713/151 |
| 2012/0216045 A1* | 8/2012 | Seguin | G06F 21/51 713/182 |

* cited by examiner

SYSTEM AND METHOD FOR HYPERVISOR-BASED REMEDIATION AND PROVISIONING OF A COMPUTER

CROSS REFERENCE TO RELATED APPLICATIONS

This application is a continuation of U.S. patent application Ser. No. 13/042,846, filed on Mar. 8, 2011, which claims the benefit of U.S. provisional patent application Ser. No. 61/311,400, filed on Mar. 8, 2010 (and entitled HYPERVISOR-BASED REMEDIATION), and of U.S. provisional patent application Ser. No. 61/312,674, filed on Mar. 11, 2010 (and entitled PROVISIONING OF A NON-CORPORATE OWNED PC TO BE A PART OF A CORPORATE IT INFRASTRUCTURE) each of which are incorporated in their entirety herein by reference.

BACKGROUND OF THE INVENTION

A computer or workstation, such as a personal computer (PC), laptop computer, etc., may be exposed to or experience faults that may cause severe deterioration of the computer's usability. Such faults may be due to a virus infection, installation of faulty updating version of operating system (OS) component, etc. When that computer is used remotely from the premises of an organization, such faults may be incurable by organizational technical support unless the faulty computer is brought onto the organization.

Some computers used as personal work stations in an organization may originally be purchased and have software installed outside of the organization. For example, many users in an organization may prefer to use their private computer also as their organizational work station. In such cases the computer may need to undergo a process that will adapt it to work with the organization computing resources, whether locally or remotely. This process may be performed by information technology (IT) personnel if it is carried out in the premises of the organization. However, this process may be time consuming, and more time consuming when the process is carried out remotely from the organization's physical premises. Typically the process requires a high security level to protect the computing resources of the organization from faults or a hostile breakthrough, which may make the process more difficult.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include an apparatus for performing the operation herein. This apparatus may be specially constructed for the desired purposes, or it may comprise a general-purpose computer selectively activated or reconfigured by a computer program stored in the computer. Such a computer program may be stored in a computer readable non-transitory storage medium, such as, but not limited to, any type of disk, including floppy disks, optical disks, magnetic-optical disks, read-only memories (ROM's), compact disc read-only memories (CD-ROM's), random access memories (RAM's), electrically programmable read-only memories (EPROM's), electrically erasable and programmable read only memories (EEPROM's), FLASH memory, magnetic or optical cards, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of embodiments of the invention as described herein.

It should be appreciated that some embodiments of the present invention may be implemented in machine-executable instructions. These instructions may be used to cause a general-purpose or special-purpose processor that is programmed with the instructions to perform the operations described. Alternatively, the operations may be performed by specific hardware that may contain hardwired logic for performing the operations, or by any combination of programmed computer components and custom hardware components.

Although the scope of the present invention is not limited in this respect, the system and method disclosed herein may be implemented in many wireless, handheld and portable communication devices. By way of example, wireless, handheld and portable communication devices may include wireless and cellular telephones, smart telephones, personal digital assistants (PDAs), web-tablets and any device that may provide wireless access to a network such, an intranet or the internet. It should be understood that the present invention may be used in a variety of applications.

A type-1 hypervisor may be installed on a computer used as personal work station by a user of that work station, remotely controlled or as an automated process initiated locally or remotely. A type-1 hypervisor may run or be executed directly on the hardware resources of the computer and may be adapted to control these hardware resources and to host and monitor guest operating systems (OSs). Such a guest OS may be executed or run as a process controlled by the type-1 hypervisor. In cases that the computer as purchased by the user is preinstalled with an OS, that OS may be denoted for example a personal OS. This OS may be considered outside of the responsibility of IT personnel of the employing organization.

Figure 1:
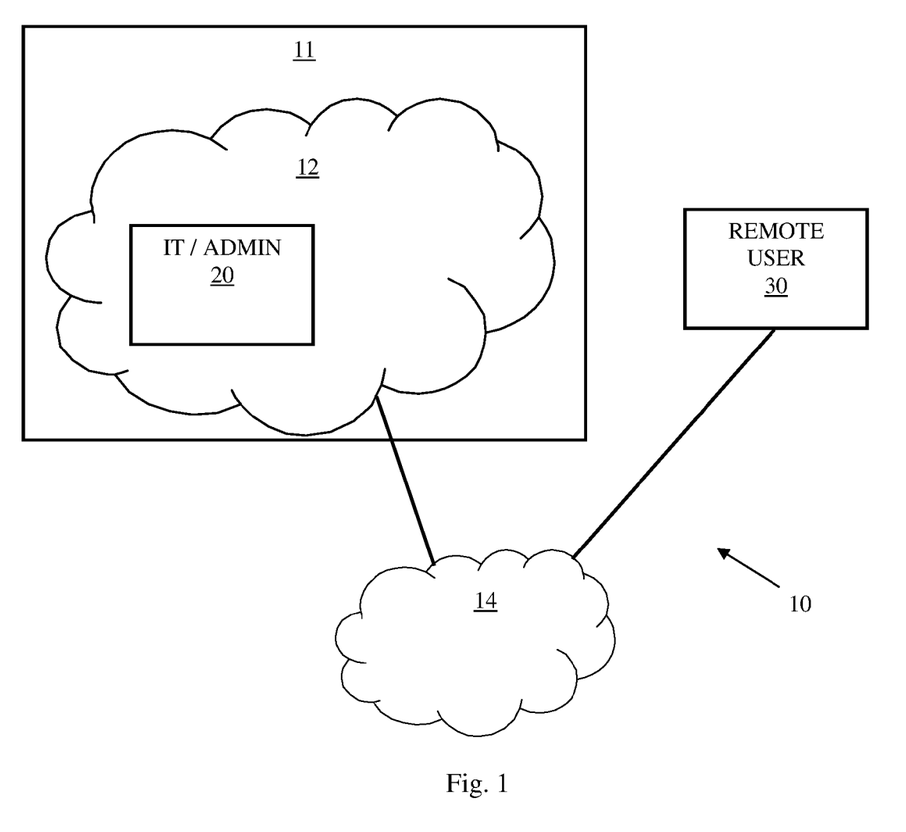
FIG. 1 is a schematic illustration of a communication network according to embodiments of the present invention.

Reference is made now to FIG. 1, which is a schematic illustration of communication network 10 according to embodiments of the present invention. Communication network 10 includes an organizational computing environment 12 of organization 11, which includes at least one IT workstation 20, a wide area network such as the Internet and a remote user workstation or computer 30. Workstation 30 may be connected to organizational computing environment 12 for example via network 14 and network 12 and may be activated or operated by a user of computer or workstation 30. IT workstation 20 may be activated or operated by a user of IT workstation or computer 20, such as IT personnel.

Figure 2:
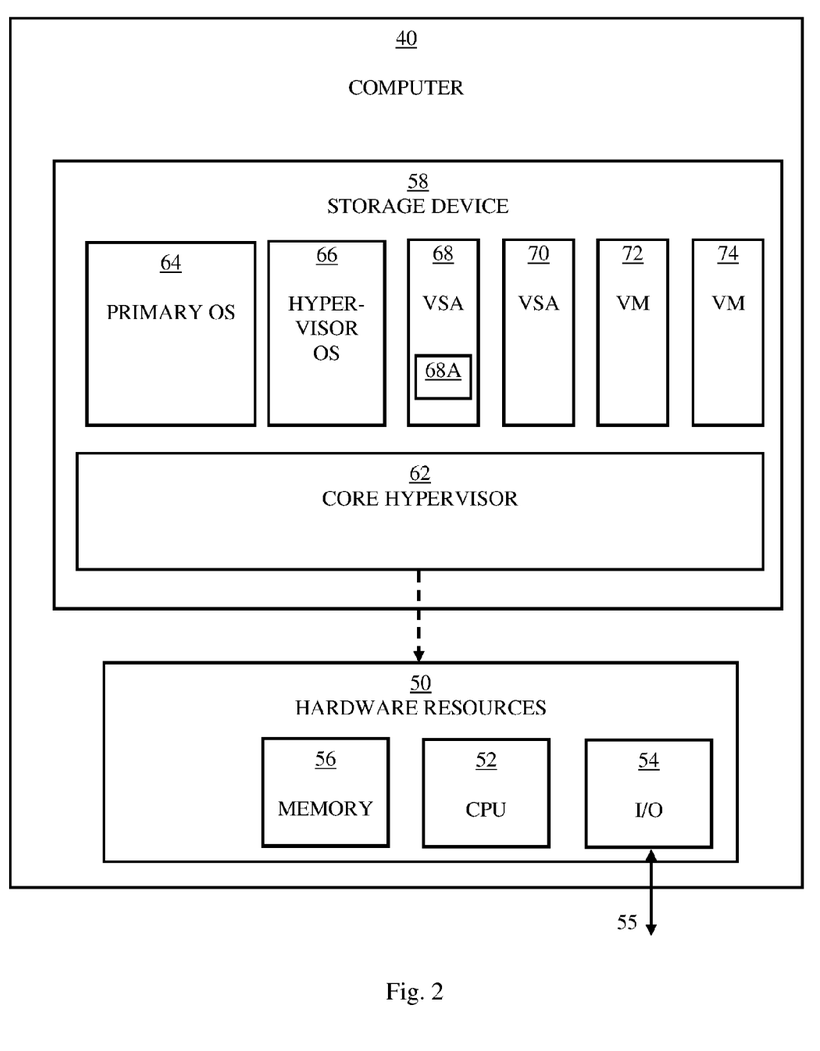
FIG. 2 is a schematic illustration of a computer adapted to function as personal work station according to embodiments of the present invention.

Reference is made now also to FIG. 2, which is a schematic illustration of computer 40 adapted to function as personal work station according to embodiments of the present invention. Computer 40 may include hardware resources 50 including, for example, a processor, central processing unit (CPU) or controller 52, memory 56 and input/output (I/O) unit 54, enabling communication from or to other computing environments, such as computing environment 12 or network such as network 14, via communication channels 55. Communication channels 55 may be one or more wired channels and wireless channels and may operate according any known communication protocol. Computer 40 may further comprise storage device 58 on which may be stored and installed for operation core hypervisor 62, primary OS 64, hypervisor OS 66, one or more virtual software appliances (VSAs) 68, 70, one or more virtual machines (VMs) 72, 74, etc. The installation of these programs may be carried out locally, by a user of computer 40 and/or remotely, for example by IT personnel of organizational computing environment 12. Core hypervisor 62 may be the core of hypervisor software solution which when operative executes or runs directly on top of hardware, in the sense that it has full access to and control over the hardware resources such as CPU 52, Memory 56, storage device 58, and devices such as I/O 54, networking hardware and graphics cards, etc. Core hypervisor 62 and hypervisor OS 66 are coupled together to provide a virtualization solution. Hypervisor OS 66 is a closed (and might be a locked) operating system which controls core hypervisor 62. Primary OS 64 may be any OS and, for example, may be the OS providing the computing environment in which the productivity of the user of computer 40 is relatively high. Primary OS 64 may be, for example a Microsoft Windows® OS or Mac OS®. For example, for a user working with the Microsoft Windows® environment and the Microsoft Word word processor, etc. the primary OS may be Microsoft Windows®.

Hypervisor OS 66 may, when executed, provide services and application program interfaces (APIs) to VSAs 68, 70, etc. Each of VSA 68 and 70 is an execution environment in which additional software agents may be hosted. VSAs 68 and 70 may enjoy benefits in the area of security and remote IT accessibility with a beneficial property of running, execution-wise "outside" of primary OS 64, thus VSAs 68 and 70 may independent of the state of primary OS 64 and may enjoy an external point of view of a running primary OS. Accordingly, for example, VSAs 68 and 70 can detect viruses in primary OS 64 from an external point of view. Each of the hypervisor OS 66, primary OS 64, hypervisor core 62, and VSAs may be code stored in for example storage device 58, and executed or run by CPU 52. However, other or different configurations may be used.

Figure 3:
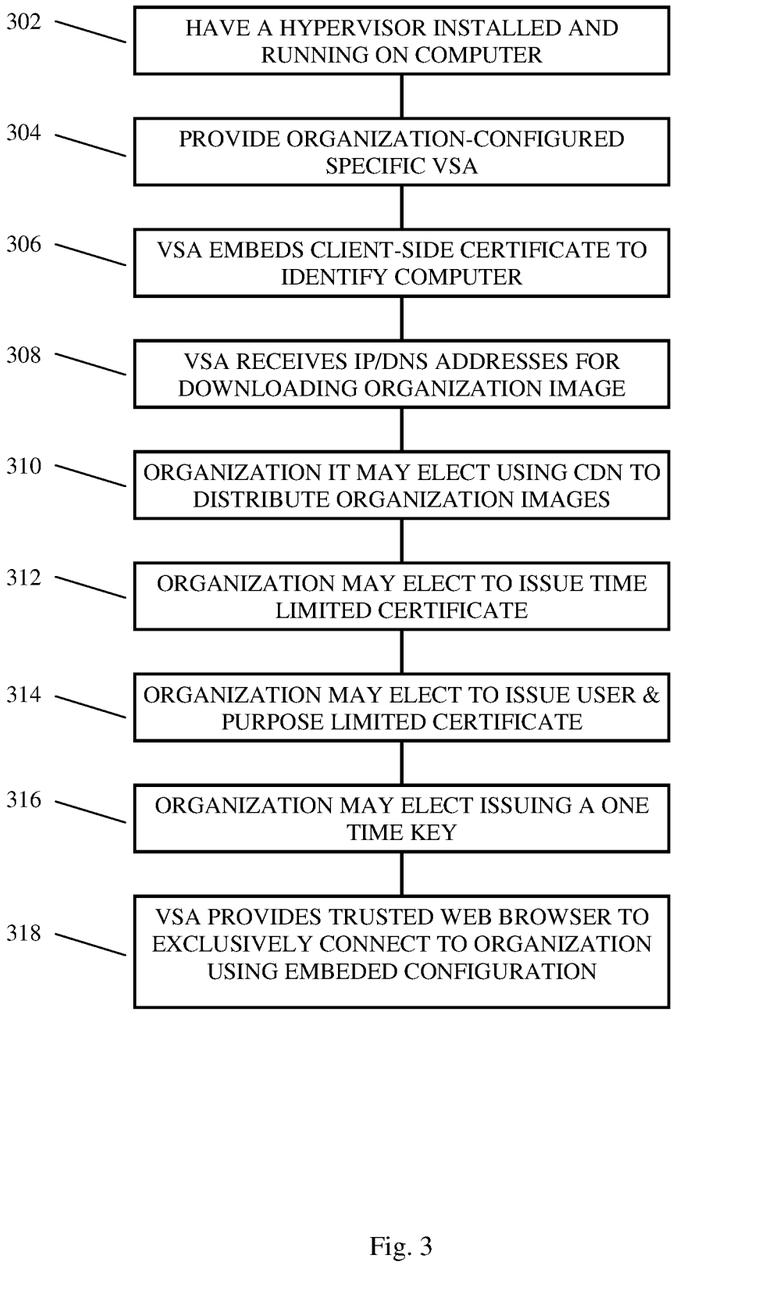
FIG. 3 is a flow diagram of a process for preparing a computer to become operative and usable in the organizational computing environment, according to embodiments of the present invention.

Reference is made now to FIG. 3, which is a flow diagram depicting a process for preparing a computer, such as computer 40 (FIG. 2) to become operative and usable in the organizational computing environment, such as organizational computing environment 12 (FIG. 1), according to embodiments of the present invention. Computer 40 may not have been purchased and/or prepared for operation by an organization, such as organization 11 (FIG. 1). Computer 40 may have installed thereon a primary OS, such as primary OS 64 (FIG. 2). Type-1 hypervisor software components may be installed and made the controlling system or operating system on the computer in any known method. For example, the computer may be configured so that the hypervisor is the controlling system, or that the computer accepts control of the hypervisor.

Installation of a hypervisor on a computer executing or running under the control of a certain OS, for example under its originally installed OS or its primary OS, such as primary OS 64, may be performed in phases. In a first phase an installer or installation program stored for example on storage device 58 may be loaded and run or executed by, for example, CPU 52. The installer may install a boot loader of the hypervisor program instead, or at the addresses used by be a boot loader of the primary OS. A boot loader is a small program that is saved in locations set in advance and known to the booting computer in a non-volatile memory portion of, for example, memory unit 56, and is first to execute when a computer boots. As such the boot loader program may direct the boot process to load and execute, for example, its associated OS. The installation of the boot loader of the hypervisor may be executing or running as a process of primary OS. During the execution, which may be controlled and carried out by the primary OS, the content of a boot sector and a boot loader storage area may be rewritten so as to contain data of a boot sector and boot loader of the hypervisor operating. This may cause, during the next-to-come boot process, loading and execution or running a hypervisor OS 66 which will function as the 'host' OS.

After a Type-1 hypervisor has been installed (block 302) a user of computer 40 may download from organizational computing environment 12 or otherwise transfer an organizational VSA and install it on computer 40 (block 304). The organizational VSA may be a VSA of (e.g., owned by) the organization, associated with the organization, configured to the organization's needs, etc. The organizational VSA may be pre-configured, for example by IT personnel of organization 11, with the information required for the deployment and provisioning of organization images, which may be images of software portions prepared and configured according to the organization's needs and features that may be applied to a computer and thus configure a non-organization owned computer according to the organization policy and needs. Provisioning of a computer may be, for example, a process of preparing a computer to work in a computing environment of an organization, for example, provisioning of remote computer 30 to work in computing environment 12 (FIG. 1). The process may include applying an organizational setup to the computer, granting organizational credentials, enabling secure communication channel between the organization computing environment and the computer, etc. Credentials and/or certificates are used to describe entities, for example data entities, used to identify user, computer, server and the like as been approved to access, use, enter etc., computing resources, such as certain files, certain types of data, certain locations in storage area, certain communication channels, etc. Information required for the deployment and provisioning of organization images may include, but is not limited to, internet protocol (IP)/domain name service (DNS) addresses of the deployment servers, such as web servers or content distribution networks (CDNs), from which the organizational VSA may be downloaded, with the required items and authentication means (such as client-side certificates). This VSA may be configured to provide an authenticated way to communicate back to the organizational computing environment. It is assumed that this technique does not rely on any security means provided by the virtualization solution.

When the organizational VSA, for example VSA 68 (FIG. 2), is installed and running it may embed a client-side certificate which may positively identify this VSA with a known list of certificates issued for the provisioning purpose (block 306). Embedding the certificate may include, for example, storing the certificate in a memory on a computer and making it available to the VSA. After computer 40 is certified by organizational computing environment 12 it may receive IP/DNS addresses of servers (probably web servers) from one or more of which an organizational user system image or other images can be downloaded (block 308). This downloading process may be carried out automatically following the certifying of computer 40, or initiated by the user of computer 40 or initiated and monitored by IT personnel of organization 11. Organization 11 policy may elect to distribute the users' system images via CDN (block 310) for efficiency and availability considerations. The organization may elect to issue time-limited client-side certificates (block 312), for enhanced security, for example a certificate that lapses after one day or one week, and/or a certificate that is valid only for one user. Additionally or alternatively organization 11 policy may elect to issue user-specific and purpose specific certificates (block 314) for the provisioning of the organization system image only. Additionally or alternatively organization 11 policy may elect to issue a one-time key for the certification (block 316) to enhance the provisioning security.

A web browser 68A or other program embedded within VSA 68 may, when executed (e.g., when executed by computer 40) provide a trusted connection to computing environment 12 of organization 11 (block 318). This trusted connection may allow IT personnel at organization 11 to remotely control the provisioning of the organization system image on computer 40. Typically an organization may take security measures to prevent installation of organization system image on a foreign computer and specifically on a remote computer.

Figure 4:
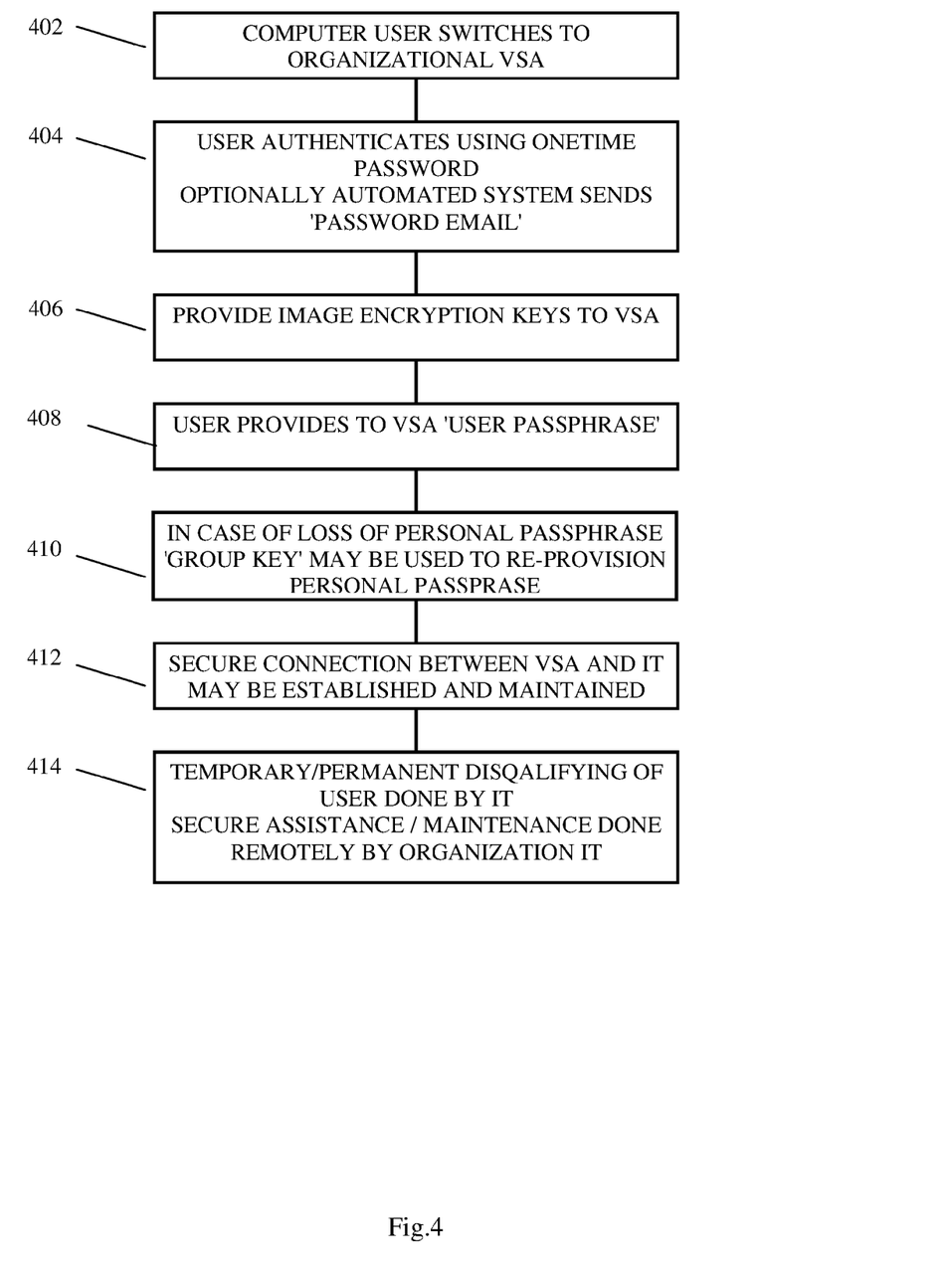
FIG. 4 is a flow diagram of establishing and using a secure connection between an organization computing environment and remote computer, according to embodiments of the present invention.

For security reasons the user system image may be provided encrypted to computer 40. The encryption may be unique to the specific computer (per its intended user), be a group-encryption or similar policy of security. Reference is made now to FIG. 4, which is a flow diagram of establishing and using secure connection between an organization computing environment and remote computer, according to embodiments of the present invention. In order to enable first-time activation of that image the user of the computer may "switch" to the downloaded organizational VSA (block 402). Switching to the VSA may include executing the VSA in place of primary OS; the switching may be carried out by or initiated by the user of computer 40. That VSA may present a "trusted user interface" to organizational computing environment 12, which is completely secure and isolated from any other VM, such as VMs 72 and 74, running or being executed on the same computer.

The computer user may identify or authenticate himself, or his computer, using for example a one-time password that may be generated by an automated system which may integrate with the existing organization user directory and may distribute onetime passwords by one or more of the communication channels: cellular SMS, and/or email, and/or automated call/voice services and the like (block 404). Optionally, an automated system integrated with organizational computing environment 12 may produce and send an email (or similar messaging means) with attached decrypting key (block 404), for example in the form of a file containing digital code. Identification or authentication methods other than a one-time password may be used.

After the session is authenticated, optionally mutually authenticated with a client certificate, the computer user may be asked to provide his personal credentials as defined by the provisioning policy for example defined at the backend service servers of the organization. Once the user of computer 40 is authenticated, the image encryption keys may be delivered to the VSA (block 406) by computing environment 12 personnel. At this stage the computer user may be asked to provide a user passphrase or password, or other security information to be used as the encryption passphrase for the disk encryption key (block 408) and the encryption passphrase may be received by VSA. This process may allow multiple passphrases to be used and known to the end-user while the IT department may know the "master" "group key". Optionally, when the personal passphrase is lost by the user of computer 40 the organizational IT personnel may use the group key to re-provision the encryption scheme with a new "local passphrase" for the user. A unique and novel setup may be made available, to maintain an independent secure connection between a remote computer, such as computer 40, and the organizational IT network 12, regardless of distance or remoteness between them. A secure connection between the VSA running or executing on computer 40 and organizational computing environment 12, for example over a hyper text transfer protocol/secure socket layer (HTTP/SSL), may be initiated by the VSA (block 412). This secure connection may be maintained according to one of several schemes, such as per or at the time of pre-defined events, in a preset interval (such as once a day) or a persistent one, or another scheme. Initiation of the secure connection by the VSA is important in order to traverse any NAT (network address translation) devices and/or networking schemes that might be deployed in the way (like a home networking device). This secure connection may be used as a "tunnel" which IT personnel of organization 11 can use to initiate additional connections (which may be using this tunnel) to be used in various use cases. If user's computer 40 needs to be decommissioned IT personnel of organization 11 can access the computer remotely and erase the organization's image. Alternatively the IT personnel may temporarily encrypt the 'group key' file on storage device 58 of the user's computer 40, thus preventing using the corporate image temporarily (block 414).

For enhanced security of the remote connection a policy can be set so that once every certain period of time, such as once a day, the VSA may ask the organization computing environment 12 IT personnel for a "lease" or other permission document and this "lease" may determine whether the organization image can be used. This may be useful in the case of temporary users, such as contractors, for which the organization wishes to allow use of the organization image for a pre-determined period of time, yet it provides the flexibility to extend this period of time without the need to re-provision the corporate image and/or the device. The established secure connection may also enable IT personnel of organization 11 to maintain the organization VSA, to install patches, to manage disk snapshots, etc. Additionally or alternatively, IT personnel of organization 11 may be able to remotely gain full control over remote computer's 12 graphical user interface (GUI) and input devices, such as keyboard or mouse. It would be appreciated by those skilled in the art that this solution differs from known remote control methods of computers, because according to embodiments of the present invention the remote computer is controlled from outside of an executing VM and therefore may be done even if no VM is executing. Additionally, since this connection and taking-over may be active from the moment a VM boots, it may be useful when, for example, the VM crashes. Additionally, this connection may enable organizational IT personnel to take over computer 40, which is remotely connected, even if the computer user is not present, since there is no need for the user's involvement in this process.

According to embodiments of the present invention the high level of security provided by the connection between the organizational computing environment and the remote computer enables authentication of any remote session executing on the remote computer in a secure way that cannot be circumvented by malware. A graphical user interface (GUI) may be presented to computer 40 user within the VSA and this GUI may ask for the permission of the user to allow IT personnel to access computer 40. This process may be performed according to a local policy defined by the user of computer 40 or a central policy defined by organizational IT personnel of organization 11 or any combination thereof. Additionally or alternatively to the above authentication process, session timeout policy may be defined so as to enable IT personnel access the remote computer even without requiring response or approval from the computer user. Additionally or alternatively, in order to prevent phishing attacks, the authentication scheme can be further augmented for increased security and be combined with an out-of-band security measure like a one-time password provided via alternative communication channels, such as over the phone, via cellular short messaging service (SMS) or via email. This one time key need to be entered in a VSA session in order to enable the authentication.

Typically provisioning a computer which was not purchased by or is not active under the control of the organization, for example by a computer of a currently foreign user joining the organization, with an organization-approved credentials in order to enable full connectivity and access to the organization computing environment, such as computing environment 12 (FIG. 1) by that computer requires the computer to be physically close to organization IT personnel. According to embodiments of the present invention when a secure remote access to the remote computer has been established, as described above, in the active OS level, organizational IT personnel may be able to provide the required credentials remotely in a secure manner (block 414). For example, during a first boot of the computer, for example computer 40, IT personnel of organization 11 may connect to the computer through the VSA and acquire full control of the organization image which may be running as a VM on the computer. IT personnel may have full control of computer inputs such as a keyboard and mouse and may be able to view a display similar to or exactly what is displayed to the user of the computer sees on the computer screen. At the appropriate phase during the provisioning of the VM, IT personnel of organization 11 may be able to provide the appropriate credentials and to complete the provisioning of the organization image in a secure manner even though the device is outside of the organization computing environment. In some cases a virtual private network (VPN) type connection may be required for one or more phases of the provisioning of the organization image. This may pose a 'chicken or egg' problem since the VPN service might not be allowed to connect before the image is provisioned. In such a case, the VPN can be embedded and pre-configured in the VSA and the VSA may re-configure the hypervisor in order to route all traffic from the VM through the VSA which will in turn route all traffic through the VPN connection that the VSA initiates back to the organization computing environment.

According to embodiments of the present invention the secure connection that may be established between organization computing environment 12 and remote computer 40 through the VSA may enable IT personnel of organization 11 to provide remote maintenance service to the computer in a secure manner (block 414). The IT personnel may perform a number of IT chores even if the VM itself is not running. Such chores include, but are not limited to, backup, patching/updating, installation of new software or deletion of old software etc. In some cases such maintenance may require the VM to be running. In order not to disturb the user of computer 40, the VSA can utilize the hypervisor's APIs and run the VM in the background of processes used by the user, without the user even noticing that the organization VM is running and without any access by the VM to any GUI. In such case, the VSA may ask the hypervisor to run the VM in the background and the VM itself can update/patch or otherwise perform any maintenance chores as configured by a local policy and/or by an organizational policy or any combination thereof.

According to embodiments of the present invention the user of remote computer 40 may request and receive the support of organization 11 help-desk in a secure manner. For that the computer 40 user may initiate a connection back to a special corporate gateway in organization computing environment 12, utilizing the VSA capabilities, for example as presented herein, and organizational IT personnel can then perform any of required actions, all performed from within the VSA, such as chatting with the user, using an embedded voice-over-IP (VoIP) solution from within the VSA to talk with the user, remotely controlling the VM, sending and/or receiving files from within the VM whether the VM is running or not, or is offline, (for example because the VM is unable to run or simply not running at this point in time).

Additionally or alternatively, the computer user may be able to access a self-provision support portal of the organization from within the VSA and to perform a number of recovery actions himself, delivered through the secure tunnel that the VSA has with the organization network. Such actions may include the provisioning by computing environment 12 to computer 40 of new software to be delivered, updating and decommissioning. Those actions can be done even when the VM is not running because it can not boot and computer local remediation schemes do not function.

A computer, such as remote user computer 30 (FIG. 1) that is connectable to an organizational computing environment, such as computing environment 12 (FIG. 1), which is located outside of and remotely from the organization computing environment may experience events that may severely limit its functionality or even completely prevent it. In such situations if the remote computer has been configured according to methods known in the art it may be difficult or impossible to assist the computer remotely by IT personnel of the organization and it may be difficult or impossible to locally recover the computer. According to embodiments of the present invention, when an organizational VSA has been securely installed on computer 40 and an operating hypervisor has been securely installed and it executes on computer 40, either the user of remote computer 40 or organizational IT personnel of organization 11 may be able to provide remediation schemes, even when the organizational VM installed on computer 40 has completely failed and is not functioning.

For example, remediation may be initiated by computer 40 user, the hypervisor of the computer may perform remediation, and remediation may be initiated by a VSA of a third-party, such as personal computer lifecycle management (PCLM). An organizational VSA installed and executing on computer 40 may take disk snapshots of storage device 58 according to a defined policy (which can be a locally defined policy by the computer user or a centrally managed policy for example defined by organizational IT personnel). A disk snapshot may be for example a copy of the data set stored on the disk and frozen at a point in time, made or produced while allowing applications to continue writing their data to disk. The extent of the dataset being written, the time at which a snapshot is taken etc. may be definable. The policy can specify whether to take a disk snapshot based on time intervals or based on certain events such as before software patch is applied to the primary OS or other events. The number of disk snapshots kept or stored may also be defined subject to local or remote policy. If a VM fails to run, whether partially or completely, it is possible, according to embodiments of the present invention, to present to the user of computer 40, after hypervisor boot and organizational VSA boot, a list of recently taken and saved disk snapshots, allowing the user to pick the snapshot he or she wishes to use for booting the VM. The list of snapshot may contain details that may assist the user to decide which snapshot to use, such as the time at which it was taken, the event that caused taking the snapshot, and additional technical information, such as whether the changes incorporate system files changes, whether the snapshot contains system patches delivered remotely or locally, that may allow the user to assess the problems of faulty snapshots. Optionally, handling tools may be available to the user to manage the list of disk snapshots, such as renaming, adding a comment and deleting a snapshot(s) in the list.

According to embodiments of the present invention instead or additionally to relying on disk snapshots, it is possible to keep a dormant copy of a VM or the initial snapshot without any changes, so that if that VM becomes non-functional computer 40 user or the organizational IT personnel of organization 11 may select, after boot of hypervisor and the organizational VSA on computer 40, to boot the dormant version of the faulty VM, instead of that faulty version of the VM. The dormant VM may be a software program that initiates a web browser that automatically connects to the organizational computing environment/IT personnel to request a healthy copy of the faulty VM, or correcting patch and/or other remediation tools. For example, such a network remediation scheme may provide the ability to boot on computer 40 a remote compact disk (CD) such as the Microsoft diagnostic and recovery toolset (DaRT) which may try to repair and rescue information on the faulty VM. According to one remediation scheme after a hypervisor and VSA boot it may be possible to boot from a locally stored dormant rescue CD, restore the primary OS to its original state (original disk snapshot), to rescue data from the primary OS and to move it into the original disk snapshot. Alternatively, it is possible to remediate the primary OS by excluding a specific snapshot from being applied in runtime to the primary OS.

According to embodiments of the present invention remediation may be performed remotely. In computer 40 the hypervisor may boot or start (e.g. execute) a special VSA instead of the normally operative VSA, which may open a virtual private network (VPN) tunnel to the organization network allowing help-desk personnel of organization 11 to remotely control the system and provide assistance to the computer user. According to certain situations, the remote remediation may be performed while the computer user works under a non-faulty OS, to maintain the user's productivity.

According to embodiments of the present invention it is possible to run on computer 40 a VM that contains a VPN and a remote desktop protocol (RDP) client which is able to connect to the organization network of organization 11 and is able to allow computer 40 user to work with a remote desktop solution over the Internet or another network. In other cases measures may be taken to separate the OS software portion of computer 40 from the application software portions and from user generated data. In these cases during boot several options may be presented to computer 40 user or to the remote organization IT personnel, including re-set the applications snapshot, re-download the applications snapshot, re-set the OS snapshot, re-download the OS snapshot and apply the user data snapshot on the pristine OS snapshot and the pristine application snapshot.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

Although the scope of the present invention is not limited in this respect, the wireless communications technologies may include radio frequency (RF) and infrared. Non-limiting examples of RF wireless standards are protocols, such as, for example, Bluetooth, IEEE-Std 802.11a, IEEE-Std 802.11b, 1999 edition, IEEE-Std 802.11g and HomeRF. Non-limiting examples of infrared light signals are protocols, such as, for example, InfraRed Data Association (IrDA) standard.

Features of various embodiments discussed herein may be used with other embodiments discussed herein. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A non-transitory computer-readable storage medium, having stored thereon instructions, when executed by a processor, causes the processor to perform a method comprising:
    executing a virtual software appliance (VSA) embedding a client-side certificate of an organization on a computer, the processor executing the VSA to identify said VSA with a known list of certificates, wherein the computer is configured so that a hypervisor is a controlling system of said computer, the computer having installed thereon a VSA of the organization;
    receiving an organizational image from a computing environment representing the organization;
    wherein executing the VSA includes executing a program embedded in said VSA to provide a trusted connection from said computer to said computing environment of said organization, and to receive image encryption keys from said organization by said VSA; and
    receiving from a user of said computer a passphrase to enable decryption of said organizational image.

2. The non-transitory computer-readable storage medium of claim 1, wherein said identifying is by a one-time password.

3. The non-transitory computer-readable storage medium of claim 1, having stored thereon instructions, when executed by a processor, causes the processor to perform a method further comprising requesting and receiving by the processor user credentials, wherein the image encryption keys are received after the user credentials are received.

4. The non-transitory computer-readable storage medium of claim 1, having stored thereon instructions, when executed by a processor, causes the processor to perform a method further comprising: initiating by the processor the trusted connection between said VSA and said organizational computing environment.

5. The non-transitory computer-readable storage medium of claim 4 wherein said trusted connection is maintained according to one of: at the time of pre-defined events, in a preset interval, and a persistent one.

6. The non-transitory computer-readable storage medium of claim 4, wherein said trusted connection is used for maintenance of said computer.

7. The non-transitory computer-readable storage medium of claim 6, wherein said maintaining comprises one or more of: installing patches, managing disk snapshots and taking-over said computer.

8. A system comprising:
    an organizational computing environment; and
    a remote computer, the remote computer comprising:
    processor to
        execute a virtual software appliance (VSA) embedding a client-side certificate of an organization on the remote computer, the processor executing the VSA to identify said VSA with a known list of certificates, an input/output unit; and
    storage device, wherein the remote computer is configured so that a hypervisor is a controlling system of said remote computer, the remote computer having installed thereon a VSA of the organization;
    wherein the computer receives from a computing environment of the organization an organizational image, executes a program embedded in the VSA to provide a trusted connection from the remote computer to the computing environment of the organization, and to receive image encryption keys from said organization by the VSA, and receives from a user of said remote computer a passphrase to enable decryption of said organizational image.

9. The system of claim 8 wherein said input/output unit is to establish secure connection with said organizational computing environment.

10. The system of claim 9, wherein said storage device to store the organizational image received via said secure connection.

11. The system of claim 9, wherein said identifying is by a one-time password.

12. The system of claim 9, wherein the processor further to request and receive user credentials, wherein the image encryption keys are received after the user credentials are received.

13. The system of claim 9, wherein the processor further to initiate the trusted connection between said VSA and said organizational computing environment.

14. The system of claim 13, wherein said trusted connection is maintained according to one of: at the time of pre-defined events, in a preset interval, and a persistent one.

15. The system of claim 13, wherein said trusted connection is used for maintenance of said remote computer.

16. The system of claim 15, wherein said maintaining comprises one or more of: installing patches, managing disk snapshots and taking-over said remote computer.

* * * * *